United States Patent
Sallas

(10) Patent No.: US 10,261,202 B2
(45) Date of Patent: Apr. 16, 2019

(54) DEVICE AND METHOD FOR MITIGATING SEISMIC SURVEY INTERFERENCE

(71) Applicant: CGG SERVICES SAS, Massy (FR)

(72) Inventor: John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 15/518,813

(22) PCT Filed: Oct. 20, 2015

(86) PCT No.: PCT/IB2015/002120
§ 371 (c)(1),
(2) Date: Apr. 13, 2017

(87) PCT Pub. No.: WO2016/063124
PCT Pub. Date: Apr. 28, 2016

(65) Prior Publication Data
US 2017/0248710 A1  Aug. 31, 2017

Related U.S. Application Data

(60) Provisional application No. 62/066,934, filed on Oct. 22, 2014.

(51) Int. Cl.
*G01V 1/00* (2006.01)
*G01V 1/38* (2006.01)

(52) U.S. Cl.
CPC .............. *G01V 1/003* (2013.01); *G01V 1/005* (2013.01); *G01V 1/3808* (2013.01); *G01V 2210/32* (2013.01)

(58) Field of Classification Search
CPC ...... G01V 1/003; G01V 1/3808; G01V 1/005; G01V 2210/32
(Continued)

(56) References Cited

U.S. PATENT DOCUMENTS 4,922,362 A   5/1990  Miller et al.
4,937,794 A   6/1990  Marschall et al.
(Continued)

FOREIGN PATENT DOCUMENTS

EP       0 201 643 A1   11/1986

OTHER PUBLICATIONS

International Search Report and Written Opinion, dated Mar. 17, 2016, from corresponding PCT application No. PCT/IB2015/002120.
(Continued)

*Primary Examiner* — Daniel L Murphy
(74) *Attorney, Agent, or Firm* — Patent Portfolio Builders PLLC

(57) ABSTRACT

A computing system and method for mitigating, in a first seismic survey, cross-talk generated by a second seismic survey. The method includes performing the first seismic survey with a first survey seismic source driven by a first survey pilot sweep, performing the second seismic survey with a second survey seismic source, simultaneously with the first seismic survey, recording with first survey seismic sensors (i) first survey seismic signals that originate from the first survey seismic source and (ii) second survey seismic signals that originate from the second survey seismic source, selecting another first survey pilot sweep, which has less cross-correlation noise with the second survey seismic signals than the first survey pilot sweep, and continuing the first seismic survey with the another first survey pilot sweep.

20 Claims, 8 Drawing Sheets

(58) Field of Classification Search
USPC .......................................................... 367/21
See application file for complete search history.

(56) References Cited

U.S. PATENT DOCUMENTS

| | | | |
|---|---|---|---|
| 5,014,249 | A | 5/1991 | Brink |
| 5,448,531 | A | 9/1995 | Dragoset, Jr. |
| 5,991,238 | A | 11/1999 | Barr |
| 6,148,264 | A | 11/2000 | Houck et al. |
| 7,382,682 | B2 | 6/2008 | Zerouk |
| 8,274,862 | B2 | 9/2012 | Sallas |
| 8,612,158 | B2 | 12/2013 | Yu |
| 8,619,497 | B1 | 12/2013 | Sallas et al. |
| 8,830,794 | B2 | 9/2014 | Ruet et al. |
| 2009/0076730 | A1 | 3/2009 | Johnson et al. |
| 2012/0014212 | A1 | 1/2012 | Eick et al. |
| 2012/0275266 | A1 | 11/2012 | Eick et al. |
| 2012/0290214 | A1 | 11/2012 | Huo et al. |
| 2014/0036623 | A1 | 2/2014 | Poole |
| 2014/0043937 | A1 | 2/2014 | Teyssandier et al. |
| 2014/0078860 | A1 | 3/2014 | Poole et al. |
| 2014/0169132 | A1 | 6/2014 | Sallas et al. |

OTHER PUBLICATIONS

Necati Gulunay et al., "Seismic interference noise attenuation", CGG Americas Inc., Denver, Colorado, Oct. 10-15, 2004.

Sanjeev Rajput et al., "Signal preserving seismic interference noise attenuation on 3D marine seismic data", CGG, New Orleans, Louisiana, Oct. 1-6, 2006.

Walt Lynn et al, "Experimental investigation of interference from other seismic crews", Geophysics, Nov. 1987, pp. 1501-1524, vol. 52, No. 11.

Margaret C. Yu, "Seismic interference noise elimination—a multidomain 3D filtering approach", SEG San Antonio 2011 Annual Meeting, 2011, pp. 3591-3595, Sep. 18-23, 2011.

N. Gulunay et al., "Spatial Prediction Filters for Attenuation of Seismic Interference Noise", CGG Americas Inc., Sep. 4-8, 2005.

Ted Manning et al., "Reduction of Acquisition Time-Sharing in the North Sea by Seismic-Interference Attenuation", EAGE 68th Conference & Exhibition, Jun. 12-15, 2006.

DEVICE AND METHOD FOR MITIGATING SEISMIC SURVEY INTERFERENCE

CROSS REFERENCE TO RELATED APPLICATIONS

The present application is a National Stage of PCT Application No. PCT/IB2015/002120, filed Oct. 20, 2015, which claims the benefit of priority under 35 U.S.C. § 119(e) to U.S. Provisional Application No. 62/066,934 filed on Oct. 22, 2014, the entire contents of which is hereby incorporated by reference.

BACKGROUND

Technical Field

Embodiments of the subject matter disclosed herein generally relate to methods and systems for removing seismic survey interference in a marine environment and, more particularly, to mechanisms and techniques for selecting a pilot signal for driving the seismic sources of a current seismic survey to minimize the impact of other seismic sources of another seismic survey that takes place in a vicinity of the current seismic survey.

Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

Reflection seismology is a method of geophysical exploration which can be used to generate the image of the subsurface. Marine reflection seismology is based on the use of a controlled source that sends pressure waves into the earth. By measuring the time it takes for the reflections to come back to plural receivers, distributed close or on the earth's surface, it is possible to estimate the depth and/or composition of the features causing such reflections. These features may be associated with subterranean hydrocarbon deposits.

In many areas, for example, the Gulf of Mexico, where many seismic contractors operate at the same time, it is common to find independent seismic surveys being conducted in adjacent areas. In order to reduce the interference (cross-talk) between the two seismic surveys, a time-share agreement is typically negotiated so that one crew is inactive while the other shoots. The restrictions imposed by time-share agreements cut productivity in half and greatly impact crew's costs.

Currently, one of the most common seismic sources in marine applications is the airgun, which is essentially impulsive (e.g., compressed air is suddenly allowed to expand). The frequency content of impulsive sources is not fully controllable, and different impulsive sources are selected depending on the needs of a particular survey. The use of impulsive sources can pose certain safety and environmental concerns.

Another class of sources that may be used is vibratory sources, for example, see U.S. Pat. No. 8,830,794, the entire content of which is incorporated herein. For vibratory sources, the source signal excitation is typically a sweep, a swept frequency sine wave excitation signal over a predetermined sweep bandwidth for a predetermined time interval. Other excitation signals are possible, for example, band limited pseudorandom signals like those disclosed in U.S. Pat. No. 8,619,497. The output of the seismic source may be continuous or semi-continuous.

The source array emits a sweep over a given sweep length as it is towed by a moving vessel. Typically, after some instrument reset period and/or listen time, the sweep is repeated to start a new recording for the new source/receiver position. Thus, a typical raw record includes both the sweep and listen time. Correlation or source signature deconvolution may be employed to collapse the data to produce a record that is similar to what might be obtained using an impulsive source. The technique of using a vibratory source followed by correlation to collapse the data is called Vibroseis. For the case of continuous or semi-continuous emissions, signals may be recorded continuously or semi-continuously over long time intervals. The recordings may be parsed later, during the processing phase, to divide the mother record up into smaller daughter records that each span a smaller time interval (for example, about 20 s in length). The daughter records time spans may overlap or not.

A seismic survey system 100 having a source array that includes individual vibratory sources is illustrated in FIG. 1. This figure shows a source array 103 being towed behind a vessel 101, at a shallow depth, following a survey course 119 operating within permit block 121. Source array 103 may include one or more source elements 107 (e.g., a vibratory element). When source array 103 is activated, acoustic energy is coupled into the water and transmitted into the earth, where part of the energy is partially reflected back from the ocean bottom and from rock formation interfaces (rock layer that has a change in acoustic impedance). Streamers 117, which are also towed by vessel 101, include seismic sensors 109, which are used to record the reflected energy. Head floats 105 are attached to the heads of the streamers for maintaining them at a desired depth. A seismic sensor may include hydrophones, geophones, accelerometers or other sensors or combinations of these sensors. Streamer 117 can be fluid filled or encapsulated with a solid fill material. Other source arrays (not shown) may be towed by different source vessels and they may be offset from source array 103 and used to generate acoustic signals whose reflections are also recorded by streamers 117.

A second vessel 151, whose course 161 is offset/different from the course 119 of the first vessel 101, may tow another source array 153. Source array 153 may include either impulsive or vibratory sources 159 and operate independently/asynchronously with respect to source array 103. In addition, source vessel 151 may tow corresponding streamers 163.

While vessel 101, source array 103 and streamers 117 belong to a first seismic survey 100, vessel 151, source array 153 and streamers 163 belong to a second seismic survey 150. For distinguishing these elements from each other, vessel 101 would be referred to as first survey vessel, vessel 151 would be referred to as second survey vessel, source array 103 would be referred to as first survey source array, and so on. The first and second survey vessels may be more than 10 km apart. Second survey vessel 151 may operate in permit block 171, which may be different than permit block 121 as illustrated in FIG. 1, or have overlapping sections.

Depending upon the seismic sensor type, the returning energy is recorded as a pressure, velocity or acceleration variation as a function of time at each sensor's position. Combining recordings made at multiple source and sensor locations can be used to form an image of the subterranean features of the earth.

Seismic signals that fall within the frequency range of 1-150 Hz are most important for seismic imaging today. Because signals from the second seismic survey 150 nearby will generally have similar spectral content as the signals recorded at the first seismic survey 100, cross-talk issues will be present in both seismic surveys. Cross-talk issues include, but are not limited to, recording at a same seismic receiver signals from sub-surfaces corresponding to both the first and second surveys. When this happens, separating the signals from the different seismic surveys becomes a difficult and expensive task.

In this regard, FIG. 2 illustrates the geometry of the cross-talk problem. The first seismic survey 100 operates first survey source array 103 while the second seismic survey 150 operates the second survey source array 153, with a separation distance 201 between them. Both source arrays 103 and 153 operate at modest depth (e.g., 5 to 50 m) below water surface 225. In the Gulf of Mexico, for example, separation distance 201 must exceed 30 km during the entire survey. Streamer 117 includes, as discussed above, many seismic sensors. However, for simplicity, FIG. 2 shows only three hydrophone groups 213, 215 and 217. Acoustic waves 203 are emitted by source array 103. A portion of the energy associated with waves 203 propagates to seafloor 205 to illuminate the subterranean survey target. Rays 207, 209, and 211 represent the total acoustic signal received by hydrophone groups 213, 215 and 217 due to source array 103. These rays may correspond to subterranean reflections due to changes in rock layer properties, reflections from the seafloor itself or other means like direct arrivals and/or surface reflections and/or refractions. These rays carry information about subsurface 219.

Simultaneously, source array 153 emits acoustic waves 225 that strike the seafloor 227, with some of that energy reflecting off as waves 229, 231, and 233, which are being also recorded by hydrophone groups 213, 215 and 217. However, the waves carry information about a different subsurface 235. If the angle of incidence for wave front 225 and region 227 is large (60 degrees or more), then the reflection coefficient can approach unity, especially if the seafloor is hard. In other cases, where the angle of incidence is smaller, the interfering signal from source array 153 may be from refracted energy that entered the earth at one point and then reemerges at second point, where it reenters the water and reaches the hydrophones. Irrespective if the mechanism is controlled by reflection or refraction, typically the cross-talk from the second survey is the largest noise contributor to the first survey. Thus, the seismic data recorded at the hydrophone groups 213, 215 and 217 describe two different sub-surfaces 219 and 235, which is undesirable.

For the scenario illustrated in FIG. 2, the recorded data from hydrophone groups 213, 215 and 217 is a superposition of desirable acoustic signals from paths 207, 209 and 211 and undesirable cross-talk signals following paths 229, 231 and 233. For the case where the second seismic survey is a competitor using vibratory sources, neither the sweep signal of the source may be known, nor the precise location of the source and shot times.

If the other crew's source signal is unknown, it may prove difficult to estimate their signal and remove it from the recorded seismic data. Methods like blind deconvolution may be employed, but may not prove fruitful and may require a large processing effort.

Thus, it would be valuable and desirable for one seismic survey to have a method that would allow independent seismic surveys to be conducted simultaneously with another seismic survey.

SUMMARY OF THE INVENTION

According to an embodiment, there is a method for mitigating, in a first seismic survey, cross-talk generated by a second seismic survey. The method includes performing the first seismic survey with a first survey seismic source driven by a first survey pilot sweep; performing the second seismic survey with a second survey seismic source, simultaneously with the first seismic survey; recording with first survey seismic sensors (i) first survey seismic signals that originate from the first survey seismic source and (ii) second survey seismic signals that originate from the second survey seismic source; selecting another first survey pilot sweep, which has less cross-correlation noise with the second survey seismic signals than the first survey pilot sweep; and continuing the first seismic survey with the another first survey pilot sweep.

According to another embodiment, there is a computing device for mitigating, in a first seismic survey, cross-talk generated by a second seismic survey. The computing device includes an interface for receiving (i) first survey seismic signals that originate from a first survey seismic source and (ii) second survey seismic signals that originate from a second survey seismic source, wherein the first survey seismic source is driven by a first survey pilot sweep and a processor connected to the interface. The processor is configured to select another first survey pilot sweep, which has less cross-correlation noise with the second survey seismic signals than the first survey pilot sweep.

According to still another exemplary embodiment, there is a computer readable medium including computer executable instructions, wherein the instructions, when executed by a processor, implement instructions for selecting a pilot signal that minimizes cross-talk with another seismic survey. The instructions implement the method steps discussed above.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a marine acquisition system that uses vibratory source elements. However, the embodiments to be discussed next are not limited to such marine environment, but they may be implemented in a land environment or for a configuration in which at least one of the two seismic surveys uses impulsive sources or a mixture of impulsive and vibratory sources.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, there is a method that allows a first seismic crew to select a pilot signal for use with a marine vibrator array so that the impact of cross-talk from a second crew on data quality is reduced. This method is most appropriate for use where the second crew is also using a marine vibratory source whose source signature is unknown. However, the method may be also adapted to work for impulsive source arrays that use air guns.

Figure 1:
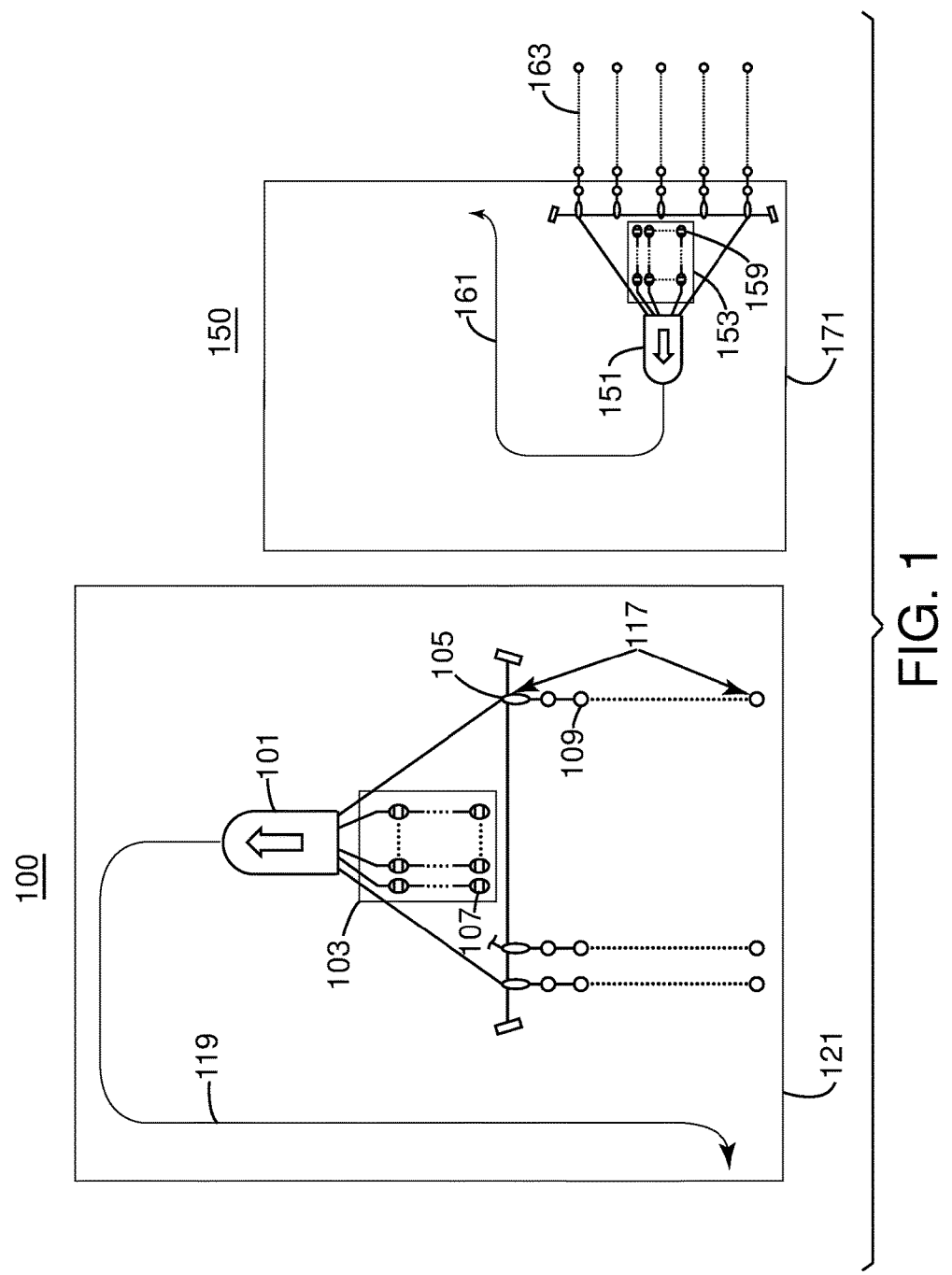
FIG. 1 illustrates two adjacent marine seismic survey systems.
Figure 2:
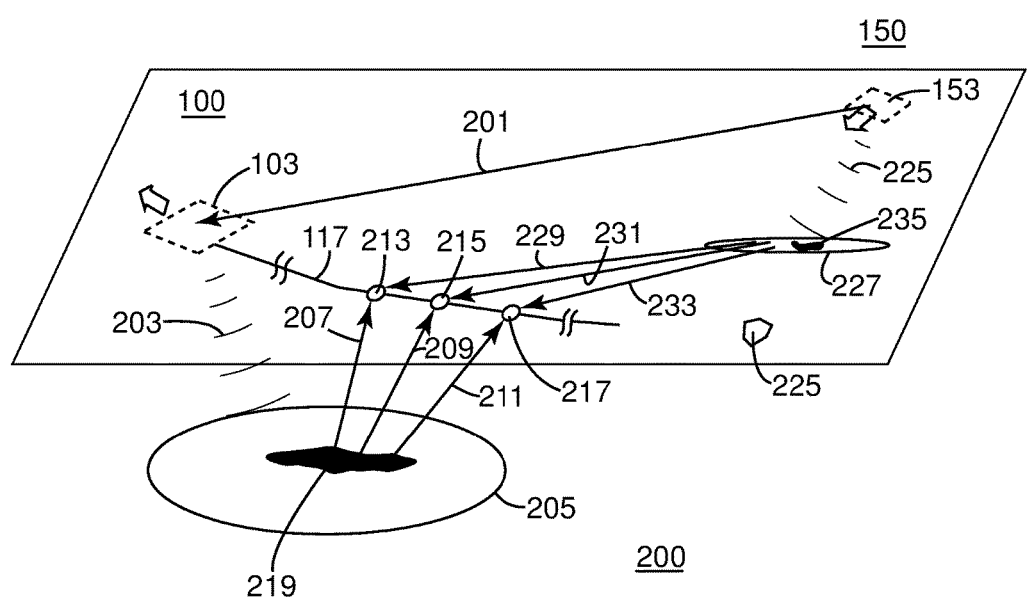
FIG. 2 illustrates the cross-talk between two seismic survey systems.
Figure 3:
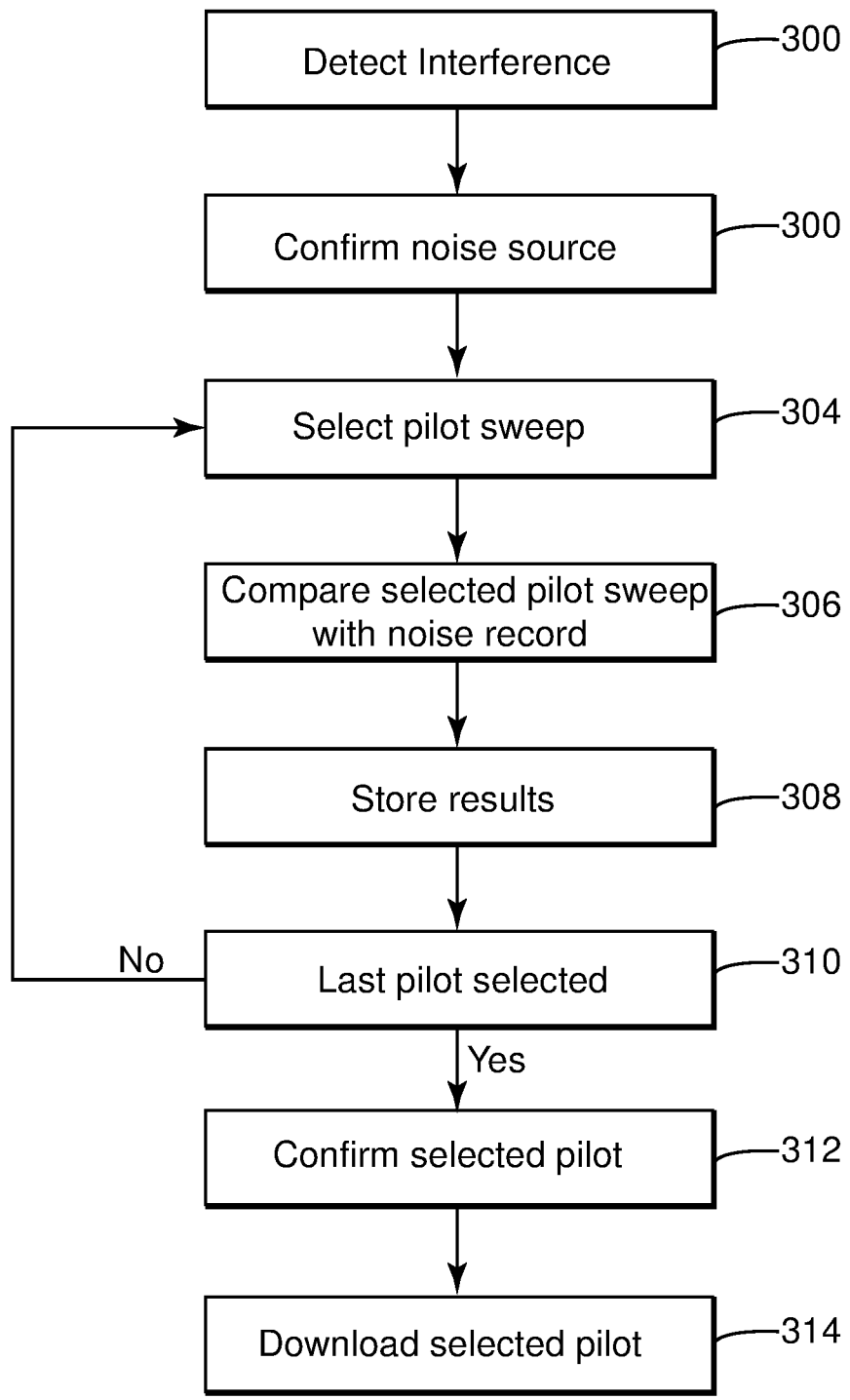
FIG. 3 illustrates a method for reducing cross-talk noise in a seismic survey
Figure 4:
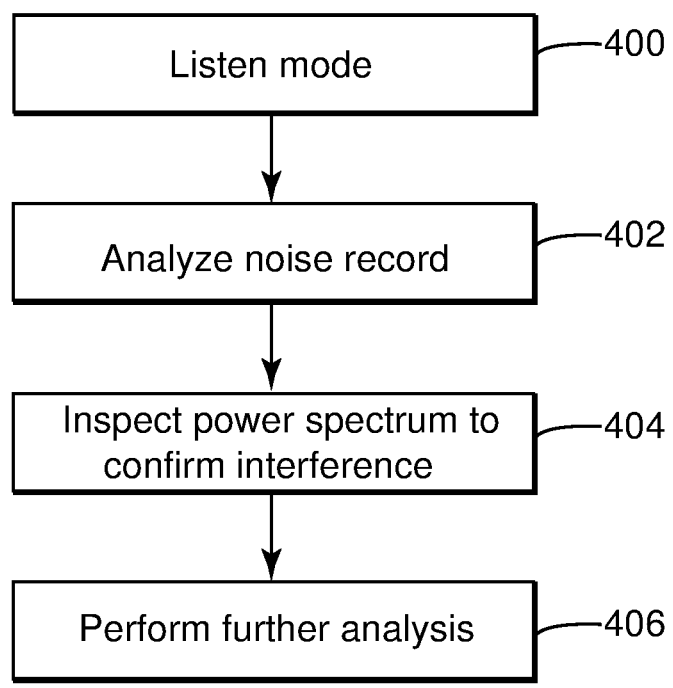
FIG. 4 illustrates some sub-steps of a step of confirming a noise.
Figure 5A:
FIGS. 5A-C illustrate an analysis of a noise record for determining whether the noise record contains significant cross-talk from another seismic survey.
Figure 5B:
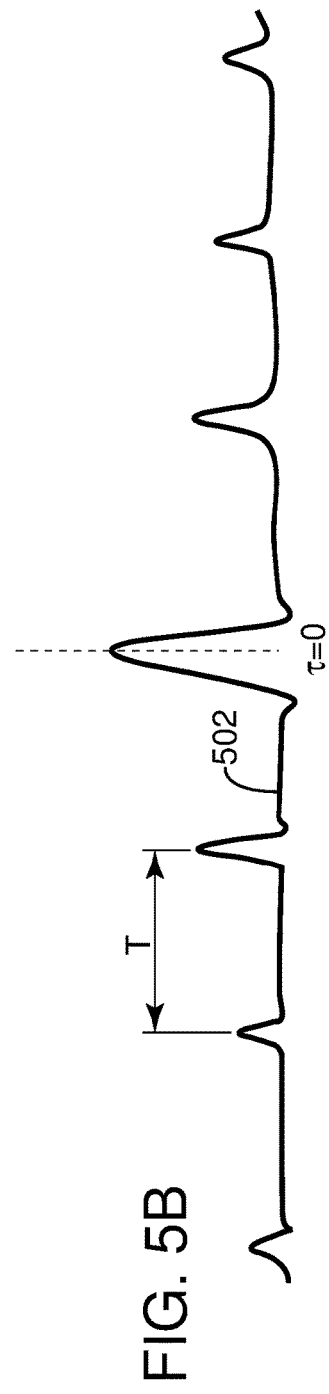

Such a method is illustrated in FIG. 3. According to this method, the first seismic crew detects in step 300 that while performing a marine seismic survey using a first seismic marine vibratory source array, interference from a second survey operating in the area is detected or suspected. This step may be performed on board of the towing vessel, using known methods of quality control of acquired seismic data. In step 302, the method confirms the noise source. This step may include one or more sub-steps as now discussed with regard to FIG. 4. FIG. 4 shows that step 302 may include a step 400 of entering a listen mode during which a noise record is made. During this step, the first survey vessel stops shooting its sources (all the sources are stopped if more than one source vessel is present in the first seismic survey) so that the seismic receivers record signals only from the second seismic survey and other unidentified sources (e.g., marine mammals, earthquakes, passing vessels, etc.). FIG. 5A shows a simulated vibratory emission, originating from the second survey vessel, as measured in a noise record. Note that the signal appears to repeat every T seconds, but the pattern may be masked by some noise. FIG. 5A illustrates a record that captures 4 shots. After seismic signals unrelated to the first seismic survey are collected for a given period of time (e.g., in the order of minutes or tens of minutes), they are analyzed on board of the vessel in step 402. These seismic signals can be considered to make up a noise record 500, because they do not originate from the first survey source array. The analysis of the noise record may include, for example, applying a method of autocorrelation to the noise record. FIG. 5B shows the result 502 of the autocorrelation.

Figure 5C:
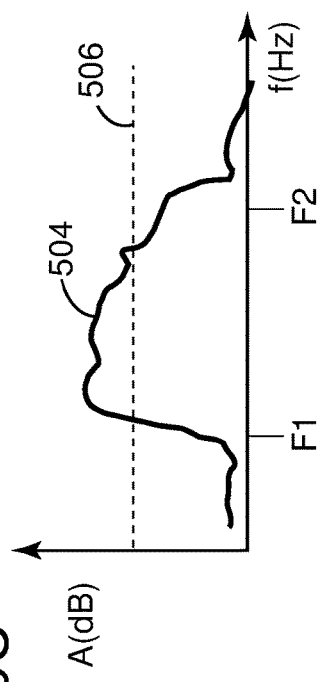

In step 404, the result 502 of the autocorrelation of the noise record 500 is inspected for determining its power spectrum. More specifically, as illustrated in FIG. 5C, the zero lag central peak of the autocorrelation is windowed and an FFT is computed to analyze its power spectrum. It is noticed in the example in FIG. 5C that the spectral amplitude 504 over the seismic frequency range of interest F1 to F2 exceeds a threshold level 506. Based on this step, it can be confirmed that interference from another seismic survey is indeed present if the autocorrelation (e.g., it shows a repeating emission as in FIG. 5B that is consistent with what might be expected from a vibrator source from another crew and has the amplitude spectrum above a certain threshold as in FIG. 5C). For example, if the noise record includes only signals from marine mammals and passing commercial vessels, that noise will not be repetitive as is the noise generated by a vibratory or impulsive source. In step 406, further analysis may be performed on the noise record and/or autocorrelated noise record data that might help identify the nature of the other crew's pilot signal. This further analysis may include transforming the recorded data into the frequency-time domain, or tau-p domain or other domains, in which a repetition pattern may be observed. In this way, the nature of the other crew's pilot signal may be determined, for example, being a swept sine wave or pseudorandom.

Returning to FIG. 3, after the method confirms that the noise record is generated by another seismic survey, it advances to step 304 in which one or more candidate pilot sweeps are selected. The pilot sweeps are traditionally generated prior to deploying the seismic acquisition system, as described, for example, in U.S. Pat. No. 8,274,862. These pilot sweeps may be stored on board of the vessel, in a library in a memory. The processor that performs the method selects sequentially each available pilot sweep. The available pilot sweeps cover the same frequency range of interest, i.e., they are designed for the first seismic survey and the subsurface to be surveyed. This library of pilot sweeps may include swept sine waves (linear, non-linear, phase encoded, etc.) or pseudorandom types. Alternatively, the sweep signals may be generated on the spot by generating, for example, a new seed value if it is a random excitation signal that uses a random number generator. If the signal is a sweep, it is possible to just provide the start and end frequencies, the type of function (e.g., linear, log, etc.) and the sweep length. Thus, the library may store not the entire sweep signals, but only sweep parameter settings that are then selected to create the alternate candidate pilot signal.

The method advances then to step 306 in which the noise record is cross-correlated with the selected pilot sweep. Those skilled in the art would recognize that other mathematical algorithms may be used instead of cross-correlation, for determining a similarity or lack of it between the noise record and the pilot sweep. The results of the similarity between the noise record and the pilot sweep may be quantified and stored in the memory in step 308, after which, in step 310, the method checks whether the last pilot selected from the library has been used in step 306. If the answer is no, the process returns to step 304 to select another pilot sweep. If the answer is yes, the process advances to step 312 to select the pilot sweep that has the smallest amount of cross-correlation noise. This selection step is based on the results stored in step 308.

Once the pilot sweep that has the smallest amount of cross-correlation noise is confirmed in step 312, the pilot sweep is downloaded into the source controller in step 314. Then, the seismic survey advances using this selected pilot sweep for shooting the sources. At this stage, the system exits the silent mode and enters an active mode, in which the source array(s) become active. The method may also include a step of collecting seismic data with the selected pilot sweep, and analyzing the data to confirm that are no new quality issues (e.g., interference) with the noise generated by the other seismic survey.

However, if after collecting some seismic data and performing further analysis as described above, it is detected that the interference noise is strong, the method illustrated in FIG. 3 can be repeated for selecting another pilot sweep. Thus, the method of FIG. 3 can be performed during the first survey as many times as necessary, and the pilot sweep that is applied to the source array may be changed as many times as necessary.

In one embodiment, the method may be modified to determine, during the listen phase, a direction from which the noise is arriving. This can be calculated, for example, in a frequency-waveform domain, i.e., the recorded noise is transformed in the frequency-waveform domain, which indicates the direction from which the noise is arriving. If this noise is confirmed to be repetitive indicating that it originates from a second survey, the method may be configured to continuously determine the direction of the noise and record this information with the seismic data. Then, during the processing phase, the seismic signals arriving from that direction can be muted to remove the noise associated with the second survey. Even if some information regarding the first seismic survey is lost due to the muting, the benefit of removing the noise may offset the lack of seismic data from a certain direction.

In another embodiment, if the method confirms that the noise is generated by the second survey, the first survey source array may be reconfigured or shot in a certain order to redirect the energy to have a minimal interference with the energy arriving from the second survey.

As noted above, the methods discussed above may be implemented when both the first and second seismic surveys use vibratory sources, or when the first survey uses vibratory sources and the second seismic survey uses impulsive sources, or even when both surveys use impulsive sources. The methods discussed above are also valid when one or both the first and second survey sources include a combination of vibratory and impulsive source elements.

Figure 6:
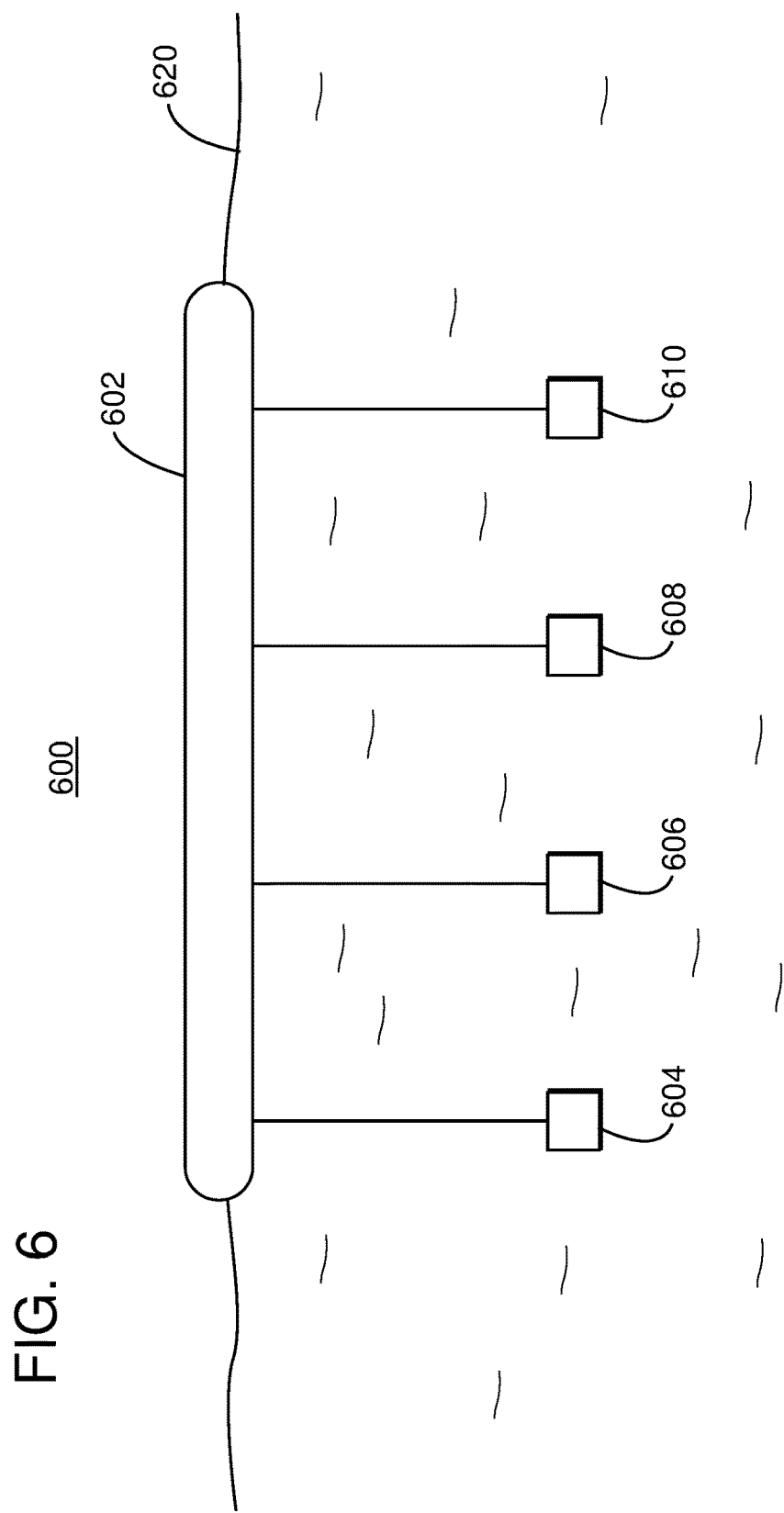
FIG. 6 illustrates a seismic source array.
Figure 7:
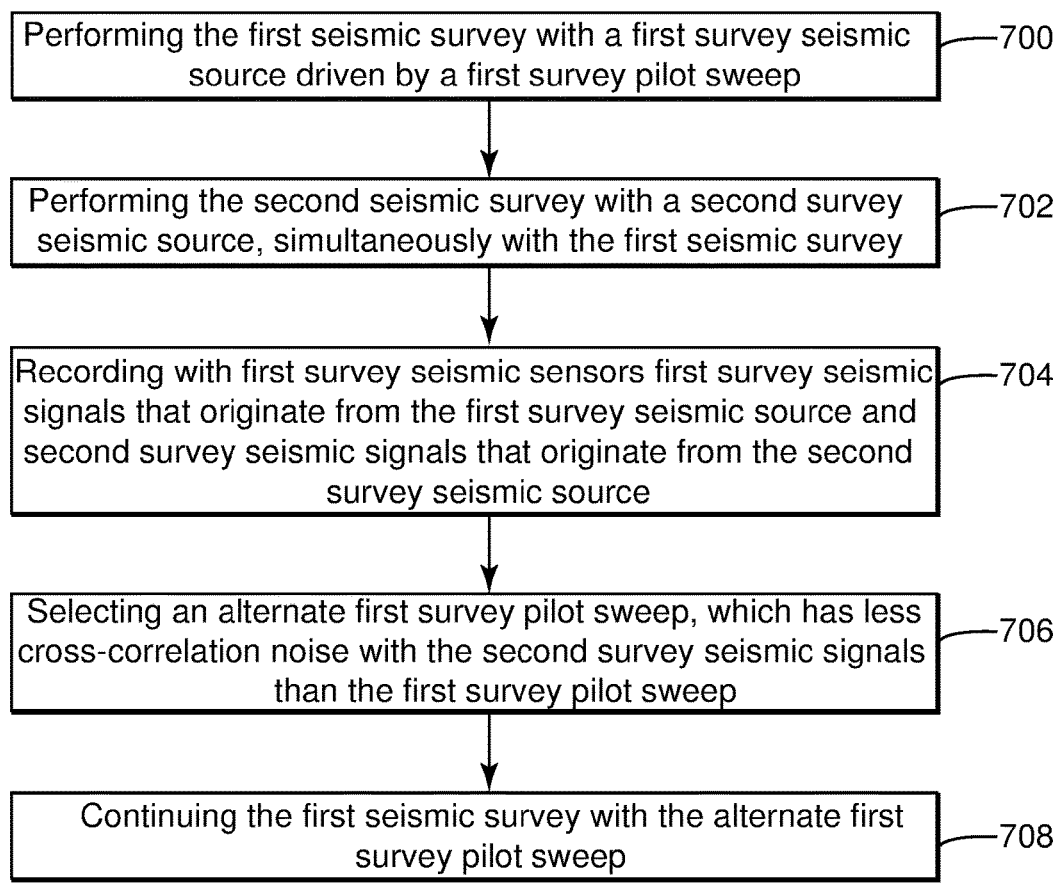
FIG. 7 is a flowchart of a method for reducing cross-talk noise in a seismic survey.

To exemplify this concept, FIG. 6 shows a source array 600 that has a float 602 floating at the water surface 620. From the float 602, four source elements 604-610 are suspended. The number of source elements can vary between 3 and 20. The depths of the source elements can also vary. In one embodiment, all source elements 604-610 are vibratory elements. In another element, all source elements are air guns. In still another embodiment, elements 604 and 606 are vibratory elements and elements 508 and 610 are air guns.

According to an embodiment, a method for attenuating, in a first seismic survey, cross-talk generated by a second seismic survey, is now discussed. The method includes a step 700 of performing the first seismic survey with a first survey seismic source driven by a first survey pilot sweep, a step 702 of performing the second seismic survey with a second survey seismic source, simultaneously with the first seismic survey, a step 704 of recording with first survey seismic sensors first survey seismic signals that originate from the first survey seismic source and second survey seismic signals that originate from the second survey seismic source, a step 706 of selecting an alternate first survey pilot sweep, which has less cross-correlation noise with the second survey seismic signals than the first survey pilot sweep, and a step 708 of continuing the first seismic survey with the alternate first survey pilot sweep.

Note that the above discussed methods may also be implemented in land seismic surveys that use vibratory sources.

Figure 8:
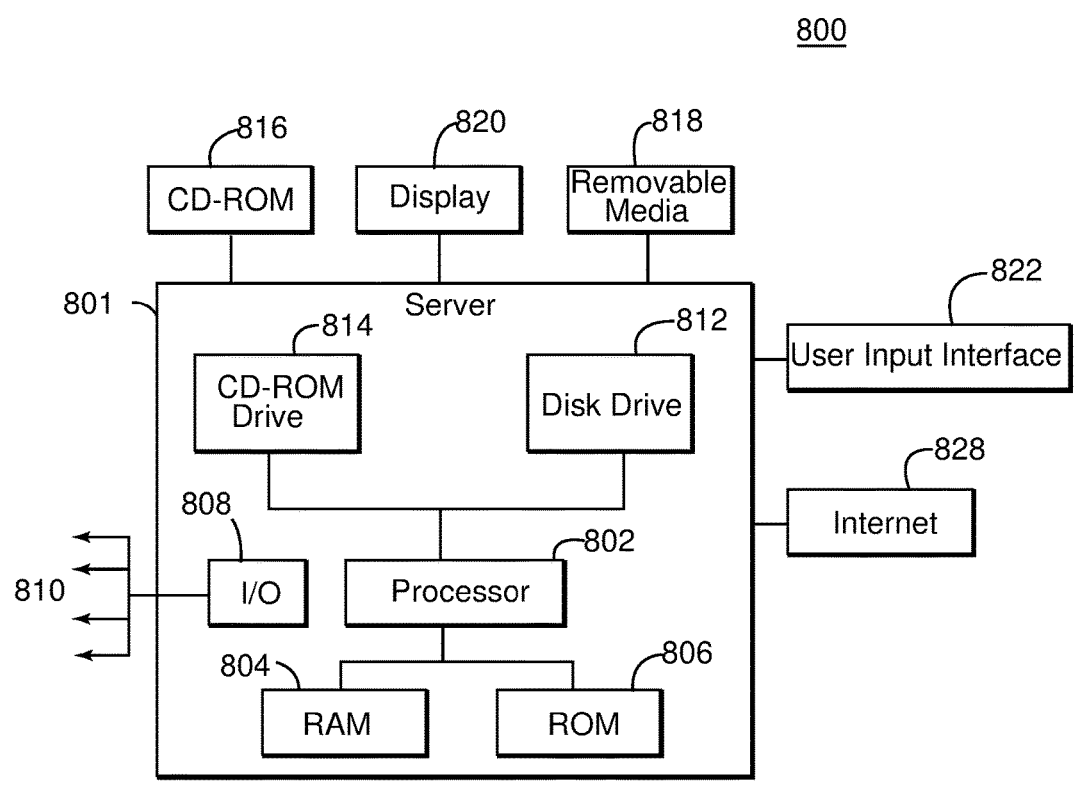
FIG. 8 is a schematic diagram of a computing device that implements the methods discussed above.

The above methods and others may be implemented in a computing system specifically configured for seismic acquisition. An example of a representative computing system capable of carrying out operations in accordance with the exemplary embodiments is illustrated in FIG. 8. This computing system may be associated with any of the source controllers that control the sources. Hardware, firmware, software or a combination thereof may be used to perform the various steps and operations described herein.

The exemplary computing system 800 suitable for performing the activities described in the exemplary embodiments may include a server 801. Such a server 801 may include a central processor (CPU) 802 coupled to a random access memory (RAM) 804 and to a read-only memory (ROM) 806. The ROM 806 may also be other types of storage media to store programs, such as programmable ROM (PROM), erasable PROM (EPROM), etc. The processor 802 may communicate with other internal and external components through input/output (I/O) circuitry 808 and bussing 810, to provide control signals and the like. The processor 802 carries out a variety of functions as are known in the art, as dictated by software and/or firmware instructions.

The server 801 may also include one or more data storage devices, including a hard drive 812, CD-ROM drives 814, and other hardware capable of reading and/or storing information such as DVD, etc. In one embodiment, software for carrying out the above-discussed steps may be stored and distributed on a CD- or DVD-ROM 816, removable memory device 818 or other form of media capable of portably storing information. These storage media may be inserted into, and read by, devices such as the CD-ROM drive 814, the disk drive 812, etc. The server 801 may be coupled to a display 820, which may be any type of known display or presentation screen, such as LCD, LED displays, plasma displays, cathode ray tubes (CRT), etc. A user input interface 822 is provided, including one or more user interface mechanisms such as a mouse, keyboard, microphone, touchpad, touch screen, voice-recognition system, etc.

The server 801 may be coupled to other computing devices, such as landline and/or wireless terminals via a network. The server may be part of a larger network configuration as in a global area network (GAN) such as the Internet 828, which allows ultimate connection to various landline and/or mobile client devices. The computing device may be implemented on a vehicle (e.g., vessel or truck) that performs a marine or land seismic survey. In one application, computing system 800 is a dedicated system that is tailored for being deployed on vessel, and also for interacting with the navigation system of the vessel.

The disclosed exemplary embodiments provide a system and a method for reducing cross-talk produced by one seismic survey in an adjacent seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for mitigating, in a first seismic survey, cross-talk generated by a second seismic survey, the method comprising:
   performing the first seismic survey with a first survey seismic source driven by a first survey pilot sweep;
   performing the second seismic survey with a second survey seismic source, simultaneously with the first seismic survey;
   recording with first survey seismic sensors (i) first survey seismic signals that originate from the first survey seismic source and (ii) second survey seismic signals that originate from the second survey seismic source;
   selecting another first survey pilot sweep among predetermined first survey pilot sweeps, the another first survey pilot sweep having less cross-correlation noise with the second survey seismic signals than the first survey pilot sweep; and
   continuing the first seismic survey with the first survey seismic source driven by the another first survey pilot sweep.

2. The method of claim 1, wherein the second survey seismic signals are recorded during a listen phase, when the first survey seismic source is stopped.

3. The method of claim 1, wherein the selecting comprises:
   storing in a memory device, a library including the predetermined first survey pilot sweeps designed for a subsurface being surveyed or a library including sweep parameter settings from which the predetermined first survey pilot sweeps are calculated.

4. The method of claim 1, further comprising:
   calculating, for each among the predetermined first survey pilot sweeps, an amount of cross-correlation noise with the second survey seismic signal; and
   selecting, as the another first survey pilot sweep, one of the predetermined first survey pilot sweeps that according to the calculating yields the smallest amount of cross-correlation noise with the second survey seismic signals.

5. The method of claim 1, wherein the predetermined first survey pilot sweeps include swept sine waves that are linear and non-linear.

6. The method of claim 1, wherein the predetermined first survey pilot sweeps include swept sine waves that are linear and non-linear and pseudo-random sweeps.

7. The method of claim 1, further comprising:
   confirming that the recorded first survey seismic signals include first interference noise due to the second seismic survey.

8. The method of claim 1, further comprising:
   recording a noise record while the first survey seismic source is silent;
   autocorrelating the noise record to obtain an autocorrelation noise; and
   identifying whether a repeated energy emission is present in a power spectrum of the autocorrelation noise.

9. The method of claim 1, wherein the first and second seismic surveys take place simultaneously in adjacent blocks.

10. The method of claim 1, wherein the first survey vibratory source is a marine source.

11. A computing device for mitigating, in a first seismic survey, cross-talk generated by a second seismic survey, the computing device comprising:
    an interface for receiving (i) first survey seismic signals that originate from a first survey seismic source and (ii) second survey seismic signals that originate from a second survey seismic source, wherein the first survey seismic source is driven by a first survey pilot sweep; and
    a processor connected to the interface and configured to,
    select another first survey pilot sweep among predetermined first survey pilot sweeps, the another first survey pilot sweep having less cross-correlation noise with the second survey seismic signals than the first survey pilot sweep,
    wherein the first survey seismic source is then driven by the another first survey pilot sweep.

12. The device of claim 11, wherein the second survey seismic signals are recorded during a listen phase, when the first survey seismic source is stopped.

13. The device of claim 11, wherein the processor is further configured to:
    store in a memory device, a library including the predetermined first survey pilot sweeps designed for a subsurface being surveyed or a library including sweep parameter settings from which the predetermined first survey pilot sweeps are calculated.

14. The device of claim 11, wherein the processor is further configured to:
    calculate, for each among the predetermined first survey pilot sweeps, an amount of cross-correlation noise with the second survey seismic signal; and
    select, as the another first survey pilot sweep, a first survey pilot sweep one of the predetermined first pilot sweeps that has the smallest amount of cross-correlation noise with the second survey seismic signals.

15. The device of claim 11, wherein the predetermined first survey sweeps include swept sine waves that are linear and non-linear.

16. The device of claim 11, wherein the predetermined first survey sweeps include swept sine waves that are linear and non-linear and pseudo-random sweeps.

17. The device of claim 11, wherein the processor is further configured to:
    confirm that the recorded first survey seismic signals include first interference noise from the second seismic survey;
    record a noise record while the first survey seismic source is silent;
    autocorrelate the noise record to obtain an autocorrelation noise; and
    identify whether a repeated energy emission is present in a power spectrum of the autocorrelation noise.

18. A non-transitory computer readable medium storing executable codes which, when executed on a computer, makes the computer perform a method for mitigating, in a first seismic survey, cross-talk generated by a second seismic survey, the instructions comprising:
    receiving (i) first survey seismic signals that originate from a first survey seismic source and (ii) second survey seismic signals that originate from a second survey seismic source, wherein the first survey seismic source is driven by a first survey pilot sweep;

selecting another first survey pilot sweep among predetermined first survey pilot sweeps, the another first survey pilot sweep having less cross-correlation noise with the second survey seismic signals than the first survey pilot sweep; and driving the first survey seismic source with the another first survey pilot sweep.

19. The medium of claim 18, further comprising:

recording the second survey seismic signals during a listen phase, when the first survey seismic source is stopped.

20. The medium of claim 18, further comprising:

storing in a memory device, a library including the predetermined first survey pilot sweeps designed for a subsurface being surveyed or a library including sweep parameter settings from which the predetermined first survey pilot sweeps are calculated.

* * * * *